United States Patent [19]

Iwatsuki et al.

[11] Patent Number: 5,765,906
[45] Date of Patent: Jun. 16, 1998

[54] VEHICLE BODY STRUCTURE MADE OF EXTRUDED MEMBERS

[75] Inventors: Shuichiro Iwatsuki; Takashi Chirifu; Akihiro Sukegawa, all of Saitama-ken, Japan

[73] Assignee: Honda Giken Kogyo Kabushiki Kaisha, Wako, Japan

[21] Appl. No.: 709,220

[22] Filed: Sep. 6, 1996

[30] Foreign Application Priority Data

Oct. 4, 1995 [JP] Japan ................................. 7-284667

[51] Int. Cl.$^6$ ................................................. B62D 27/00
[52] U.S. Cl. ............................ 296/203; 296/209; 296/29
[58] Field of Search .............................. 296/203, 204, 296/205, 209, 29, 30

[56] References Cited

U.S. PATENT DOCUMENTS

| | | | |
|---|---|---|---|
| 5,201,566 | 4/1993 | Mori | 296/209 X |
| 5,209,541 | 5/1993 | Janotik | 296/209 X |
| 5,213,386 | 5/1993 | Janotik et al. | 296/209 X |
| 5,338,080 | 8/1994 | Janotik et al. | 296/203 X |
| 5,553,906 | 9/1996 | Kunz | 296/205 X |

FOREIGN PATENT DOCUMENTS

| | | | |
|---|---|---|---|
| 315450 | 2/1934 | Italy | 296/203 |
| 4046875 | 2/1992 | Japan | 296/203 |
| 4133874 | 5/1992 | Japan | 296/197 |
| 5162670 | 6/1993 | Japan | 29/897.2 |
| 337137 | 10/1930 | United Kingdom | 296/203 |

*Primary Examiner*—Dennis H. Pedder
*Attorney, Agent, or Firm*—Armstrong, Westerman, Hattori, McLeland & Naughton

[57] ABSTRACT

In a space frame type vehicle body structure, a floor member has a side sill inner half securely attached along each side edge thereof, and a side frame has a side sill outer half securely attached along a lower edge thereof, and these two halves are provided with mutually cooperating snap fit arrangement. Because the floor member and the side frame are individually provided with a sufficient rigidity, and they can be temporarily secured each other simply by pushing them against each other, they can be welded together with a high dimensional precision without requiring any massive or complex clamping fixture.

4 Claims, 4 Drawing Sheets

VEHICLE BODY STRUCTURE MADE OF EXTRUDED MEMBERS

TECHNICAL FIELD

The present invention relates to a space frame type vehicle body structure which is suited to be made of hollow members such as extruded members made of aluminum or other light-weight alloy.

BACKGROUND OF THE INVENTION

In recent years, various attempts have been made to use aluminum or other light-weight alloy for the construction of vehicle bodies. In particular, extruded members have been increasingly preferred as structural members because of the ease of fabrication, and a high level of freedom in the shape of the cross section. The cross section of an extruded member can have a highly complex shape, and the various sections in the cross section can have different wall thicknesses. Therefore, by combining structural members having different cross sections, it is possible to achieve a required mechanical strength of the vehicle body while minimizing the overall weight of the vehicle body structure.

A vehicle body constructed by joining extruded hollow members by welding is often called as a space frame structure. In such a structure, a side sill member is provided between each side edge of a floor member and a corresponding side frame. The side sill member has to be welded either to the floor member or to the side frame before the side frame is joined to the floor member. However, the floor member and the side frame member tend to lack a sufficient rigidity by themselves, and typically demonstrate a sufficient rigidity only when the side sill member is joined to them. Therefore, when joining the side frame and the floor member together, one of them, which does not have the side sill member attached thereto, may be so readily deformable that it is difficult to weld the floor member and the side frame together with a sufficient dimensional precision without requiring a highly complex clamping arrangement for holding the two parts during the welding process. In particular, because a part of the door frame is directly attached to the side sill member, any slight warping of the side frame or the floor member can cause a serious dimensional error in the door opening which prevents proper installation of a door.

BRIEF SUMMARY OF THE INVENTION

In view of such problems of the prior art, a primary object of the present invention is to provide a vehicle body structure made of extruded hollow members which can simplify the process of welding a floor member to a side frame.

A second object of the present invention is to provide a vehicle body structure made of extruded hollow members which can ensure a high dimensional precision after welding a floor member to side frame.

According to the present invention, these and other objects can be accomplished by providing a space frame type vehicle body structure essentially made by combining hollow extruded members, comprising: a floor member having a side sill inner half securely attached along each side edge thereof; and a side frame having a side sill outer half securely attached along a lower edge thereof; the side sill inner half and the side sill outer half being provided with mutually cooperating engagement means for at least temporarily joining the two halves together.

The side sill inner half ensures a sufficient rigidity to the floor member while the side sill outer half ensures a sufficient rigidity to the side frame so that the dimensional stability of these two parts can be ensured until they are permanently joined by welding. In particular, if the mutually cooperating engagement means comprises a snap fit arrangement, the assembling process can be simplified. Particularly a secure temporary attachment can be accomplished if one of the side sill inner half and the side sill outer half is provided with a recess which receives a complementary part of the other of the side sill inner half and the side sill outer half, and the mutually cooperating engagement means is provided along each side of the recess and along each side of the complementary part.

According to a preferred embodiment of the present invention, the mutually cooperating engagement means includes an outer engagement portion serving as a hinge defining a hinge axis extending along an axial direction of the side sill halves, and an inner engagement portion capable of snap fit engagement. Thus, the side frame thus attached to the floor member can be more resistant to an inwardly directed bending force which tends to pivot the side frame inward around the hinge axis. Therefore, by placing the center of gravity of the side frame laterally inward of the inner engagement portion, the structural stability of the temporarily assembled vehicle body can be favorably ensured.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
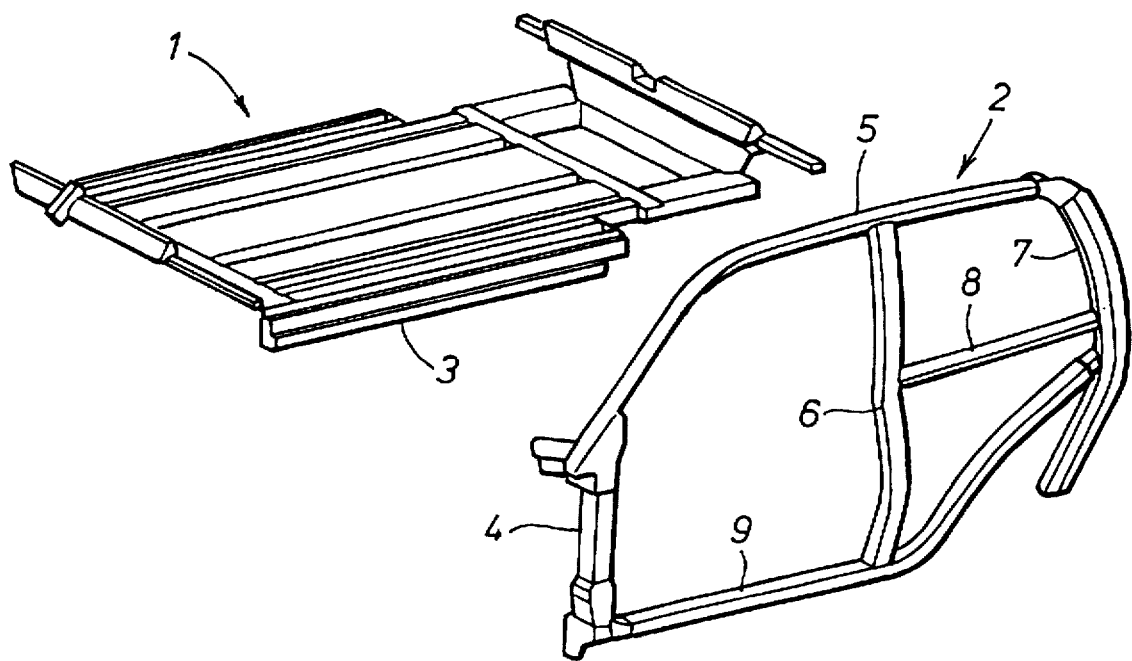
FIG. 1 is an exploded perspective view of a vehicle body frame according to the present invention.
Figure 2:
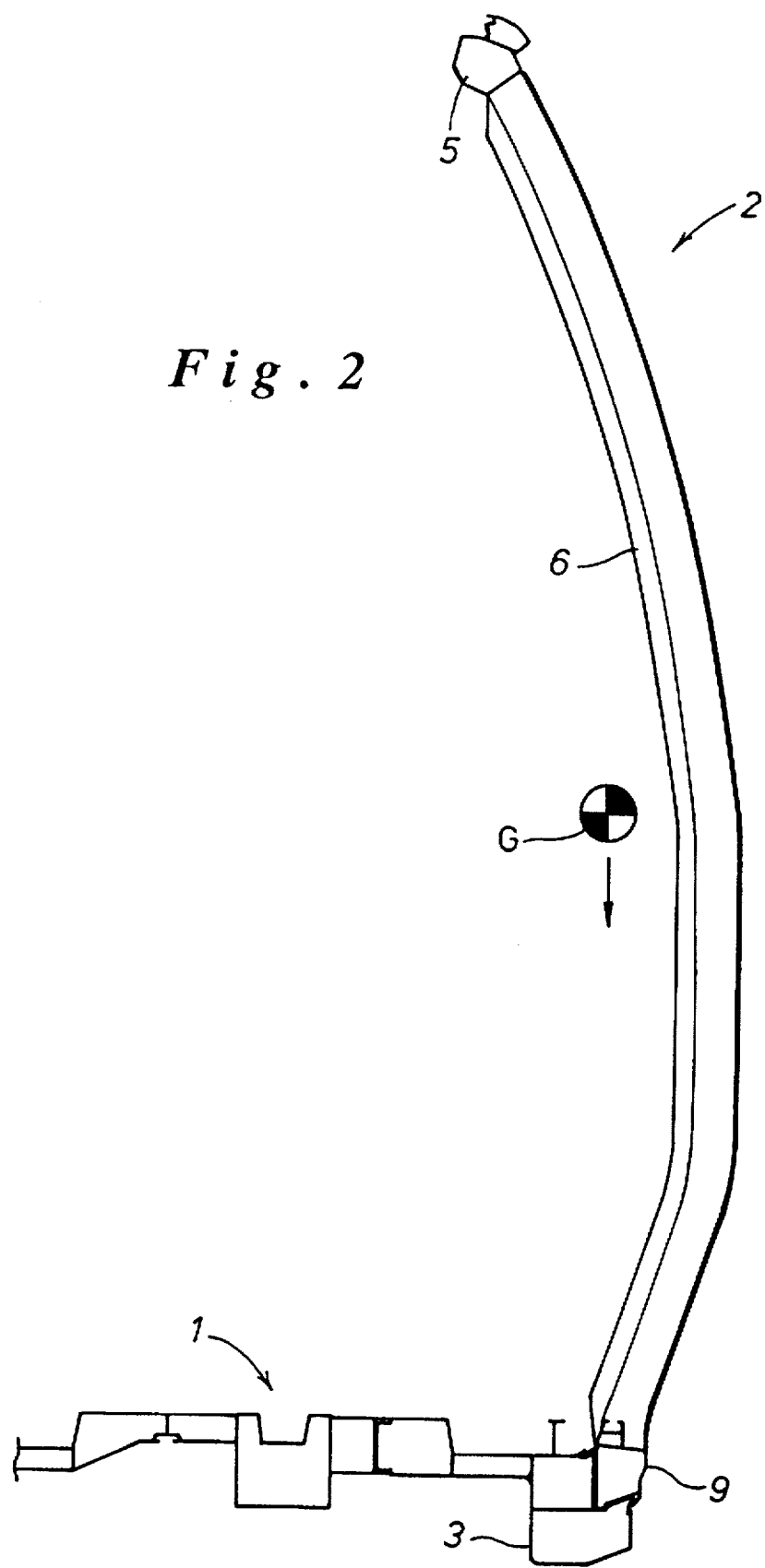
FIG. 2 is a vertical sectional view of the vehicle body frame at its assembled state.

Referring to FIGS. 1 and 2, the illustrated vehicle body frame consists of a space frame which is made welding a number of extruded hollow members. The extruded members are made by aluminum alloy, and have appropriate cross sections depending on different structural requirements. The vehicle body frame comprises a floor member 1 and a side frame 2.

The floor member 1 consists of a plurality of hollow extruded members extending in the fore-and-aft direction which are arranged one next to the other along the lateral direction. The individual hollow extruded members are provided with frictional locking devices in the form of snap fit arrangements which can securely join the floor member 1 and the side frame 2 together until they are permanently joined by welding in a subsequent assembling step. Each laterally outermost extruded member consists of a side sill inner half 3.

The side frame 2 comprises a front pillar 4, a roof side member 5 extending rearward from the upper end of the front pillar 4, a center pillar 6 extending downward from an intermediate point of the roof side member 5, a rear pillar 7 extending downward from the rear end of the roof side member 5, a side beam 8 which joins intermediate points of the center pillar 6 and the rear pillar 7, and a side sill outer half 9 which is joined to the lower ends of the front pillar 4 and the center pillar 6. In this embodiment, the rear end portion of the side sill outer half 9 is bent upward and joined to an intermediate point of the rear pillar 7 so as to define a part of a rear wheel house.

Thus, according to the present invention, the side sill member is laterally divided into two parts, the side sill inner half 3 which is integral with the floor member 1 and the side sill outer half 9 which is integral with the side frame 2. The floor member 1 and the side frame 2 are both provided with their respective side sill halves, and are therefore provided with a sufficient rigidity as individual assemblies. In particular, because the door frame of the side frame 2 is completely closed by the side sill outer half 9, the dimensional precision of the door opening can be ensured.

Figure 4:
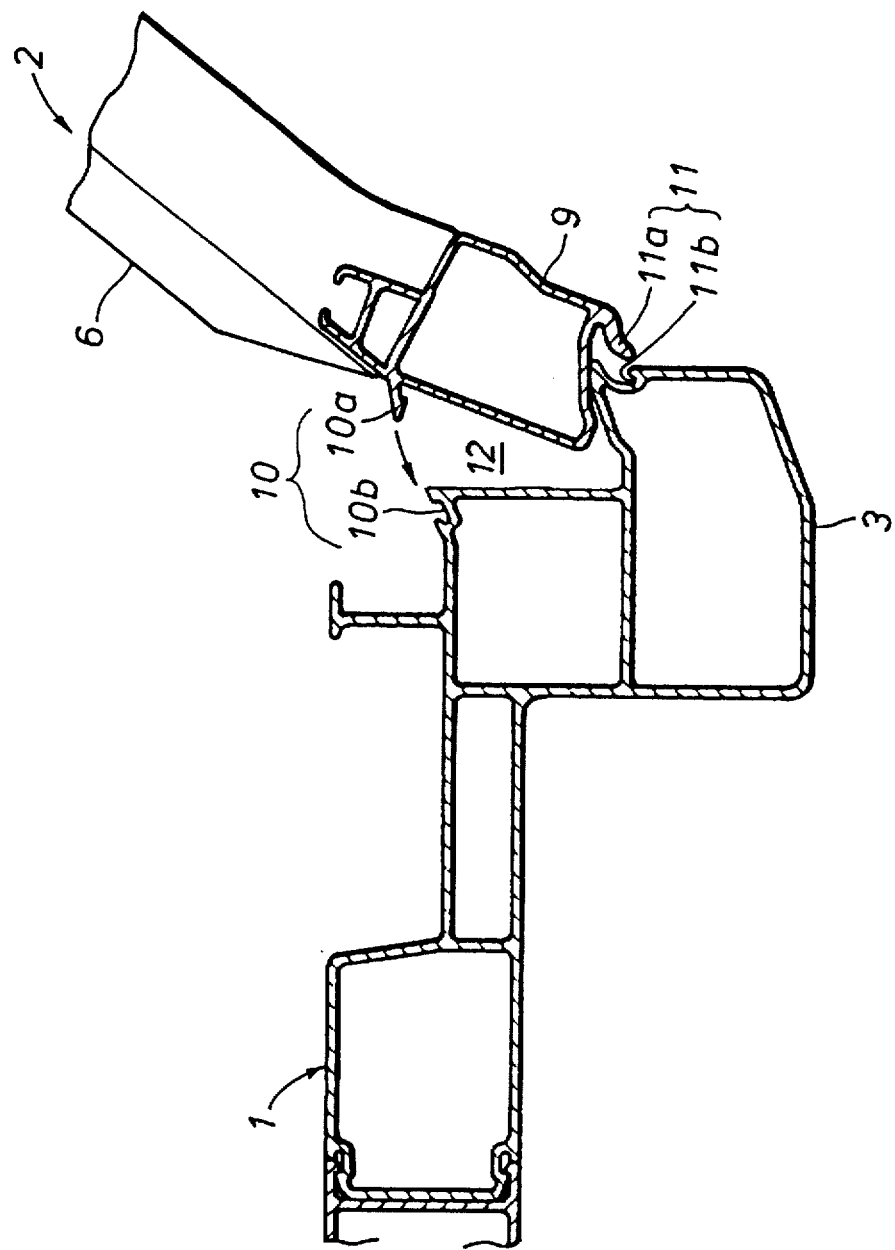
FIG. 4 is a view similar to FIG. 3 showing an assembling step according to the present invention.

Referring to FIG. 4, the side sill inner half 3 is provided with a rectangular recess 12 along its upper outer corner, and a complementary part of the side sill outer half 9 fits into this recess 12. A pair of grooves 10b and 11b are provided in the side sill inner half 3 along either side of the recess 12. Corresponding projections 10a and 11a are provided in the side sill outer half 9. In particular, the free end of the upper projection 10a is provided with a barb.

As shown in FIG. 4, the lower projection 11a is initially fitted into the lower groove 11b, and the side sill outer half 9 along with the entire side frame 2 is pivoted around this engagement portion 11 inward (as indicated by the arrow) until the upper projection 10a fits into the upper groove 10b. The lower engagement portion 11 serves as a hinge having a hinge axis extending along the longitudinal direction of the side sill halves 3 and 9. Because of the barbed end of the upper projection 10a, the upper projection 10a can snap fit into the corresponding upper groove 10b. The lower projection 11a is prevented from moving laterally by the outer edge of the lower groove 11b. Therefore, in the assembled state of FIG. 3, the floor member 1 and the side frame 2 are securely joined with each other, in particular against the force to pivot the side frame 2 outwardly around the lower engagement portion. The two parts can be therefore mutually retained in a fixed geometric relationship until they are permanently joined by welding. In particular, the center of gravity G of the side frame 2 is located laterally slightly inside the engagement portions 10 and 11, the side frame 2 can retain its upright position with a high level of stability.

Figure 3:
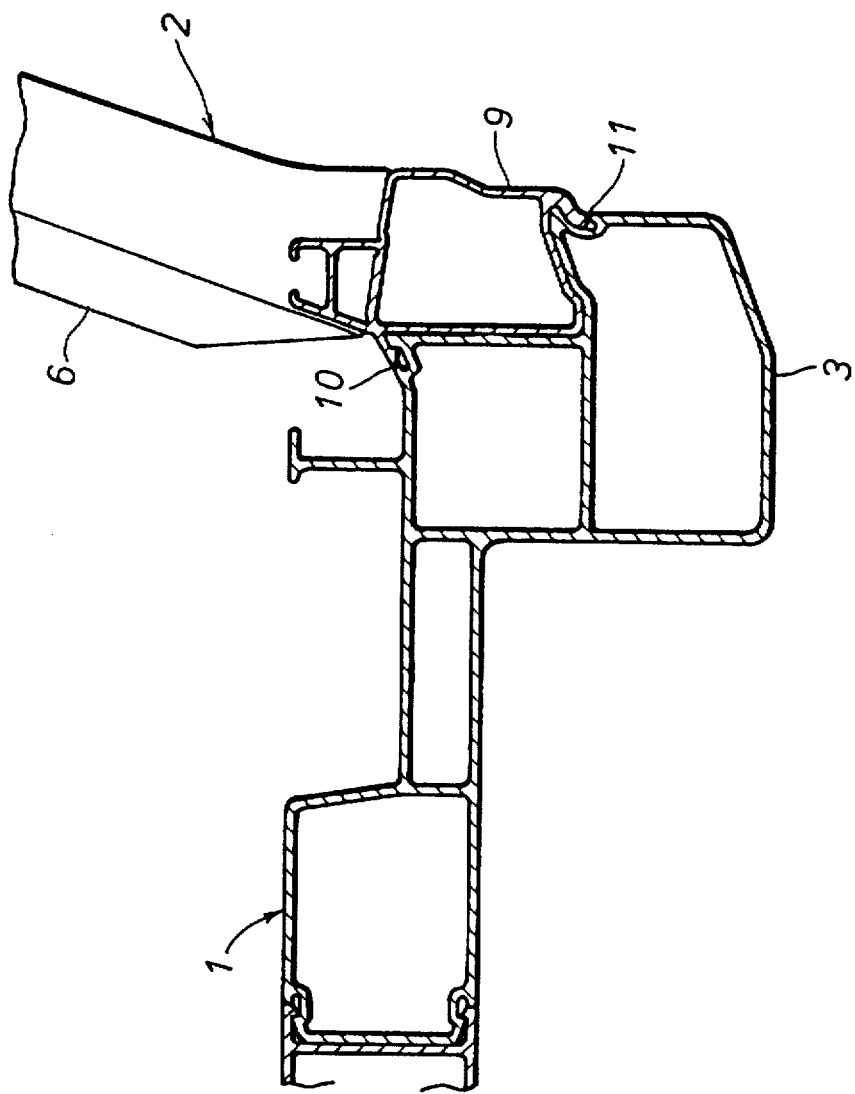
FIG. 3 is a fragmentary sectional view showing a part of FIG. 2.

Normally, the engagement portions 10 and 11 are securely and permanently joined by laser welding. The engagement portions 10 and 11 are designated as upper and lower engagement portions in the above disclosure, but they may also be designated as inner and outer engagement portions because the two engagement portions 10 and 11 may be disposed relatively to each other not only as illustrated in FIG. 3 but also horizontally aligned or vertically aligned as can be readily appreciated by a person skilled in the art.

According to the present invention, because the floor member and the side frame are individually provided with a sufficient rigidity, and they can be temporarily secured each other, for instance simply by pushing them against each other, they can be welded together with a high dimensional precision without requiring any massive or complex clamping fixture.

Although the present invention has been described in terms of a specific embodiment thereof, it is possible to modify and alter details thereof without departing from the spirit of the present invention.

What we claim is:

1. A space frame type vehicle body structure essentially made by combining hollow extruded members comprising:

a floor member having a side sill inner half integrally formed along each side edge thereof; and said side sill inner half and said side outer half being provided with mutually cooperating frictional locking engagement means operative for at least temporarily joining said two side sill halves together, wherein said mutually cooperating engagement means includes a lower engagement portion serving as a hinge defining a hinge axis extending along an axial direction of said side sill halves, and an upper engagement portion operative to effect snap fit engagement between said side sill halves.

2. A space frame type vehicle body structure according to claim 1, wherein one of said side sill inner half and said side sill outer half is provided with a recess which receives a complementary part thereof on the other of said side sill inner half and said side sill outer half.

3. A space frame type vehicle body structure according to claim 2, wherein said mutually cooperating frictional locking engagement means includes one of a projection and a groove provided along each side of said recess and the other of said projection and said groove provided along each side of said complementary part for cooperation with said engagement means associated with said recess.

4. A space frame type vehicle body structure according to claim 1 wherein said side frame has a center of gravity disposed laterally inward of said lower engagement portion.

\* \* \* \* \*